United States Patent
Tsao et al.

(10) Patent No.: US 9,189,088 B2
(45) Date of Patent: Nov. 17, 2015

(54) ELECTRONIC DEVICE AND TOUCH OPERATING METHOD THEREOF

(71) Applicant: Acer Incorporated, New Taipei (TW)

(72) Inventors: Tzung-Heng Tsao, New Taipei (TW); Tse-Chia Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 91 days.

(21) Appl. No.: 14/062,904

(22) Filed: Oct. 25, 2013

(65) Prior Publication Data

US 2015/0009155 A1 Jan. 8, 2015

(30) Foreign Application Priority Data

Jul. 8, 2013 (TW) .............................. 102124433 A

(51) Int. Cl.
*G06F 3/0354* (2013.01)
*G06F 3/044* (2006.01)

(52) U.S. Cl.
CPC ............ *G06F 3/03545* (2013.01); *G06F 3/044* (2013.01); *G06F 2203/04101* (2013.01)

(58) Field of Classification Search
CPC ................ G06F 3/03545; G06F 3/044; G06F 2203/041; G06F 2203/04108; G06F 2203/04802
See application file for complete search history.

(56) References Cited

U.S. PATENT DOCUMENTS

| 5,149,919 | A * | 9/1992 | Greanias et al. ........... 178/18.02 |
| 2005/0156914 | A1 * | 7/2005 | Lipman et al. ................ 345/179 |
| 2008/0225007 | A1 * | 9/2008 | Nakadaira et al. ............ 345/173 |
| 2009/0167702 | A1 * | 7/2009 | Nurmi ........................... 345/173 |
| 2012/0162214 | A1 * | 6/2012 | Chavez et al. ................ 345/419 |
| 2012/0327042 | A1 * | 12/2012 | Harley et al. ................. 345/179 |
| 2013/0021288 | A1 * | 1/2013 | Karkkainen et al. .......... 345/173 |
| 2013/0088465 | A1 * | 4/2013 | Geller et al. .................. 345/179 |
| 2014/0340318 | A1 * | 11/2014 | Stringer ........................ 345/173 |

FOREIGN PATENT DOCUMENTS

| CN | 202049289 | 11/2011 |
| TW | 200745924 | 12/2007 |

* cited by examiner

*Primary Examiner* — Sanjiv D Patel
(74) *Attorney, Agent, or Firm* — Jianq Chyun IP Office

(57) ABSTRACT

An electronic device and a touch operating method thereof are provided. The electronic device includes a touch screen, a storage unit and at least one processing unit, and the touch operating method includes following steps. A touch object above the touch screen is detected by using the touch screen, and a distance between the touch object and the touch screen is estimated. A relative angle of a pointing direction of the touch object with respect to a normal direction of the touch screen is detected. According to the distance and the relative angle, a function is performed on an object displayed by the touch screen.

10 Claims, 6 Drawing Sheets

ELECTRONIC DEVICE AND TOUCH OPERATING METHOD THEREOF

CROSS-REFERENCE TO RELATED APPLICATION

This application claims the priority benefit of Taiwan application serial no. 102124433, filed on Jul. 8, 2013. The entirety of the above-mentioned patent application is hereby incorporated by reference herein and made a part of this specification.

BACKGROUND OF THE INVENTION

1. Field of the Invention

The invention generally relates to an electronic device and touch operating method thereof. More particularly, the invention relates to a hover touch operating method and an electronic device thereof.

2. Description of Related Art

In today's society filled with information, the dependence on consumer electronic devices increases gradually among human beings. In order to achieve a more convenient, smaller, compact and more user-friendly objective, a touch screen is utilized to replace a conventional keyboard or a conventional mouse and served as an input device. Due to the fact that electronics having touch function are convenient to operate and more intuitive responsive for human, they are favorable among consumers and has become the trend of the market today. Along with the advancement of the electronics having touch function, touching the screen directly has not been able to satisfy the needs of the consumers. Therefore, an electronic device supporting hover touch has been developed in recent years, so that a user may operate the touch screen without touching the screen directly (i.e., hovering), which further enhances the touch operation in the manner of convenience and intuitiveness.

Currently, the hovering touch sensing devices in the market mostly determines whether an object or a finger hovers above the screen by utilizing variations in capacitance effects generated by the object (e.g., a stylus) or the finger, so as to provide different functions corresponding to the hovering operation. In other words, user may easily operate the electronic device without touching the screen directly (i.e., hovering operation) by placing the stylus or the finger above the touch screen of the electronic device. Therefore, a hovering touch operating method is indeed a way that will dramatically change user's experience in the input function. For the electronic device having a hovering touch sensing function, how to apply the hovering touch function to the operation of the electronic device or the operation of the application program is one of the topics that those skilled in the field concerns.

SUMMARY OF THE INVENTION

The disclosure provides an electronic device and a touch operating method thereof. Through monitoring a distance and an angle between a touch object and a touch screen, corresponding functions are performed on an object displayed on the screen, so as to enhance the convenience in operating the electronic device.

The disclosure provides a touch operating method of an electronic device, which is configured for an electronic device having a touch screen. The touch operating method includes the following steps. A touch object positioned above the touch screen is detected by utilizing the touch screen, and a distance between the touch object and the touch screen is estimated. Next, a relative angle of a pointing direction of the touch object with respect to a normal direction of the touch screen is detected. Then, a function is performed on an object displayed in the touch screen according to the distance and the relative angle.

The disclosure provides an electronic device, which includes a touch screen, a storage unit and one or more processing units. The storage unit is configured to record a plurality of modules. The processing units is coupled to the touch screen and the storage unit and configured to access and execute the modules recorded in the storage unit. The module recorded in the storage unit includes a distance detecting module, an angle detecting module and a function executing module. The distance detecting module is configured to detect a touch object positioned above the touch screen by utilizing the touch screen and estimate a distance between the touch object and the touch screen. The angle detecting module is configured to detect a relative angle of a pointing direction of the touch object with respect to a normal direction of the touch screen. The function executing module is configured to perform a function on an object displayed in the touch screen according to the distance and the relative angle.

Accordingly, the electronic device and the touch operating method thereof of the disclosure detects the distance between the touch object and the touch screen as well as the relative angle of the pointing direction of the touch object with respect to the normal direction of the touch screen. Through variations of the hovering distance and the relative angle of the touch object, the electronic device may perform a corresponding function on an object displayed on the touch screen or adjust an effect of the function applied to the object. Based on the feelings of human toward variations in the distance and angle, the disclosure provides an operating method close to human's intuitive feelings.

In order to make the aforementioned and other features and advantages of the disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
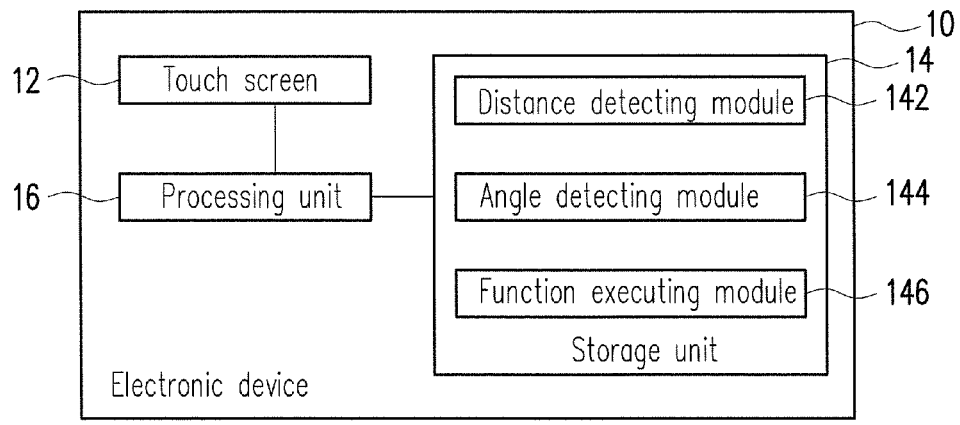
FIG. 1 is a block diagram illustrating an electronic device according to an embodiment of the disclosure.

Reference will now be made in detail to the present embodiments of the invention, examples of which are illustrated in the accompanying drawings. Wherever possible, the same reference numbers are used in the drawings and the description to refer to the same or like parts.

In general, values sensed by touch detecting components of a touch screen vary when a touch object is placed and moved within a certain distance from the touch screen, which allows an electronic device to detect an existence of the touch object. Based on such property, a distance between the touch object and the touch screen may be determined by utilizing a sensing result detected by the sensors. In addition, a relative angle formed between the touch object and the touch screen may be determined by utilizing the touch detecting components or other sensors. Thus, based on the human's feelings toward variations in distance and angle, the electronic device may utilize the distance and the angle between the touch object and the touch screen as control variables for a hovering control. Accordingly, a touching operation that is flexible and close to human's intuition is provided. In order to make the content of the present disclosure comprehensible, the following embodiments are given for implementing the disclosure.

FIG. 1 is a block diagram illustrating an electronic device according to an embodiment of the disclosure. With reference to FIG. 1, an electronic device 10 is, for example, a mobile phone, a smart phone, a personal digital assistant (PDA), a tablet computer, an electronic book, a gaming console, and any other electronic device having a touch screen, though the disclosure is not limited thereto. The electronic device 10 includes a touch screen 12, a storage unit 14 and one or more processing units 16, where functions of these components are described hereafter.

The touch screen 12 is a display device integrated with touch detecting components, which simultaneously provides a display function and an input function. The display device is, for example, a liquid crystal display (LCD), a light-emitting diode (LED), a field emission display (FED), or other displays, and the disclosure is not limited thereto. The touch detecting components are disposed in the display device and arranged in rows and columns, which are configured to receive a touch event or a hover event. The touch event includes events generated by touching the touch screen 12 with a finger, a palm, body parts or other objects. The hover event includes events generated by hovering the finger, the palm, the body parts or other objects above the touch screen 12. The touch detecting components are, for example, capacitive touch detecting components, surface acoustic touch detecting components, electromagnetic touch detecting components, near-field imaging detecting components, and the likes.

The storage unit 14 is, for example, any fixed or removable random access memory (RAM), read-only memory (ROM), flash memory, hard drive, any other similar devices or a combination thereof. The storage unit 14 is configured to record a plurality of modules performed by the processing unit 16, which are capable of being loaded into the processing units 16 to execute a touch operation.

The processing unit 16 is, for example, a central processing unit (CPU), or a programmable microprocessor, a digital signal processor (DSP), a programmable controller, an application specific integrated circuit (ASIC), a programmable logic device (PLD) or other similar devices or a combination thereof utilized for general or specific application. The processing unit 16 is coupled to the touch screen 12 and the storage unit 14, so that the modules recorded in the storage unit 14 are accessed to execute the functions of touch operation.

The modules include a distance detecting module 142, an angle detecting module 144 and a function performing module 146. These modules are, for example, computer programs which can be loaded into the processing unit 16 to perform the functions of touch operation through a hovering operation. Embodiments are illustrated below to describe the touch operation of the electronic device 10 in details.

Figure 2:
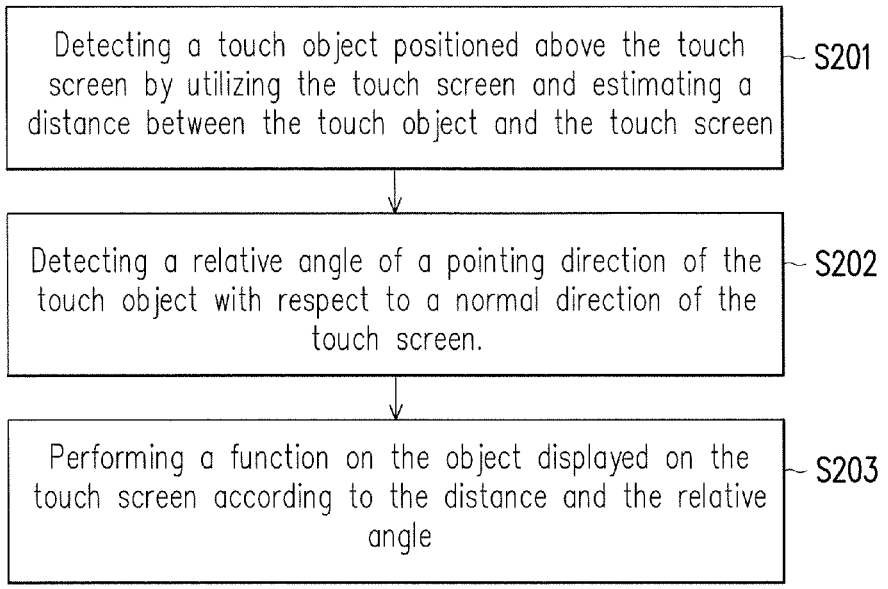
FIG. 2 is a flow diagram illustrating a touch operation according to an embodiment of the disclosure.

FIG. 2 is a flow diagram illustrating a touch operation according to an embodiment of the disclosure. With reference to FIG. 2, the method described in the present embodiment is configured for the electronic device 10 illustrated in FIG. 1. The touch operation of the disclosure is described in detail accompanying with the components in the electronic device 10 hereafter.

First of all, a distance detecting module 142 detects a touch object positioned above the touch screen 12 by utilizing the touch screen 12 and estimate a distance between the touch object and the touch screen 12 (step S201). In detail, the distance detecting module 142 may detect the touch object through the touch detecting components of the touch screen 12 when a distance between the touch object and the touch screen 12 is within a certain distance as the touch object approaches the touch screen 12. Furthermore, the distance detecting module 142 estimates the distance between the touch object and the touch screen 12 through a sensing result of the touch detecting components. For example, the distance between the touch object and the touch screen 12 may be a shortest distance between the touch object and the touch screen 12, thought the disclosure is not limited thereto.

Next, the angle detecting module 144 detects a relative angle of a pointing direction of the touch object with respect to a normal direction of the touch screen 12 (step S202). In general, if a touch operation is performed by a user through a stylus, the stylus would point toward the touch screen 12 in different angles due to the manners how a user holds the stylus. To be specific, regarding the relative angle of the pointing direction of the touch object with respect to the normal direction of the touch screen, the relative angle may be obtained through the value sensed by the touch detecting components disposed in the touch screen, the relative angle θ may also be obtained through sensors disposed in the stylus or the electronic device.

For example, the angle detecting module 144 detects the touch object by utilizing the touch screen 12 and obtains a capacitive distribution by detecting the touch object through a plurality of touch detecting components of the touch screen 12. Next, the angle detecting module 144 determines the relative angle of the pointing direction of the touch object with respect to the normal direction of the touch screen according to the characteristic of the capacitive distribution. On the other hand, the angle detecting module 144 may also determines the relative angle of the pointing direction of the touch object with respect to the normal direction of the touch screen by utilizing at least one sensor disposed in the electronic device 10 and the touch object.

Accordingly, in addition to the distance between the touch object and the touch screen, in the present embodiment, the relative angle between the touch object and the touch screen may also be one of the factors for controlling the touch operation. Through the relative angle and distance between the touch object and the touch screen, users may operate the electronic device 10 with more realistic experience. Afterward, the function performing module 146 performs a function on the object displayed on the touch screen 12 according to the distance and the relative angle (step S203). For example, when the user is operating an application simulating three-dimensional (3D) engraving, the user may adjust the engraving force through the distance of the touch object. Furthermore, the user may also adjust a cutting angle of an engraving cutter according to the relative angle of the touch object. However, the disclosure is not limited thereto.

Figure 3:
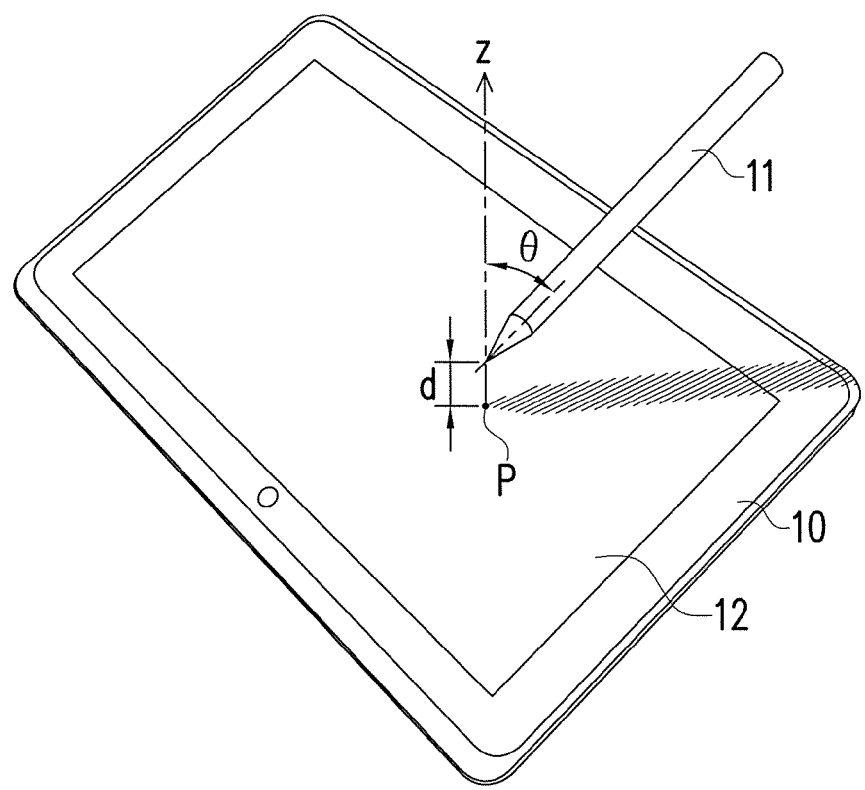
FIG. 3 is a diagram illustrating a touch operating method according to an embodiment of the disclosure.

In order to clearly describe the disclosure, FIG. 3 is a diagram illustrating a touch operating method according to an embodiment of the disclosure. It should be noted that the disclosure is not limited to the stylus illustrated in the embodiment. With reference to FIG. 3, when the user performs a hover operation through the stylus, the user holds the stylus 11 and positions the stylus 11 above the touch screen 12 without touching the touch screen 12. Generally, a tip of the stylus 11 is positioned at a location closest to the touch screen 12. The electronic device 10 detects the existence of the stylus 11 when the distance between the stylus 11 and the touch screen 12 is within a certain distance.

In other words, the electronic device 10 detects the stylus 11 positioned above the touch screen 12 by utilizing the touch screen 12. Afterwards, the electronic device 10 estimates a distance d between the stylus 11 and a point P on the touch screen 12 through the value sensed by touch sensors. For example, if the touch detecting components are capacitive sensing components, a capacitance sensed by the capacitive sensing component at the point P on the touch screen 12 increases as a tip of the stylus 11 approaches the point P displayed on the touch screen 12. In addition, the electronic device 10 further detects a relative angle θ of the pointing direction of the stylus 11 with respect to the normal direction of the touch screen 12 (i.e., in a direction of Z-axis). According to the distance d and the relative angle θ, the electronic device 10 performs the corresponding functions to the object displayed on the touch screen 12.

Figure 4A:
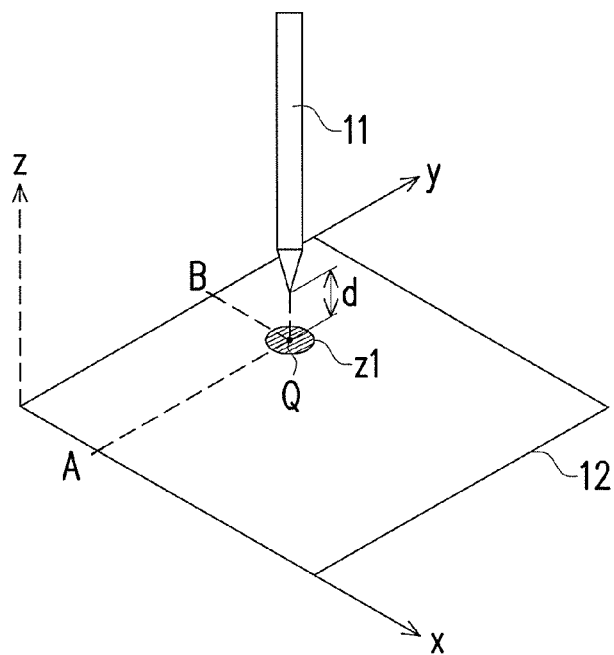
FIG. 4A is a diagram illustrating a touch operating method according to an embodiment of the disclosure.
Figure 4B:
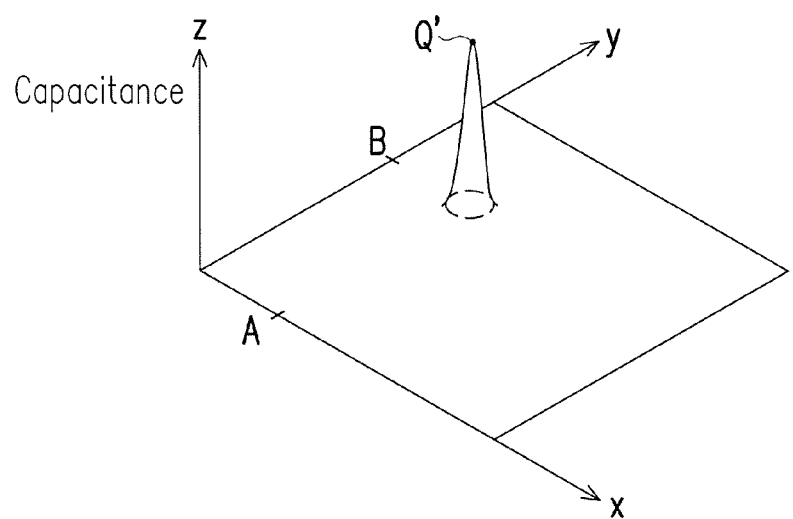
FIG. 4B is a diagram illustrating a capacitance distribution according to an embodiment of the disclosure.

Regarding the relative angle θ of the point direction of the stylus 11 with respect to the normal direction of the touch screen 12, the relative angle θ may be obtained through the values sensed by the touch detecting components disposed in the touch screen 12. In addition, the relative angle θ may also be obtained according to the sensors disposed in the electronic device 10 or the stylus 11, though the disclosure is not limited thereto. FIG. 4A is a diagram illustrating a touch operating method according to an embodiment of the disclosure. FIG. 4B is a diagram illustrating a capacitance distribution according to an embodiment of the disclosure. With reference to FIG. 4A, in the embodiment, the touch detecting components of the touch screen 12 are capacitive touch detecting components, and it is assumed that a x-axis and a y-axis are respectively parallel to two edges of the touch screen 12 that are perpendicular to each other, and a z-axis extends in a direction parallel to the normal direction of the touch screen 12.

The touch screen 12 includes a plurality of capacitive touch detecting components arranged in rows and columns, where the touch screen 12 utilizes variations in the capacitance of each of the capacitive touch detecting components to obtain touch information. For example, when the touch object approaches the touch screen, the capacitive touch detecting components determine that the touch object is positioned above the touch screen 12 due to the sudden increase in the capacitance of the capacitive touch detecting components. As illustrated in FIG. 4A, when the stylus 11 approaches a touch point Q on the touch screen 12 having a coordinate of A on x-axis and a coordinate of B on y-axis in an angle that is almost perpendicular to the touch screen 12, the capacitance of the touch detecting components within a region z1 on the touch screen 12 changes in response to the approach of the stylus 11.

In other words, each of the capacitance touch detecting components generates a capacitance in response to the touch event, which forms a capacitance distribution when all of the capacitance sensed by the capacitance touch detecting components are combined into a distribution. FIG. 4B is a diagram illustrating a capacitance distribution generated under a condition relative to the condition illustrated in FIG. 4A. With reference to FIG. 4B, a reference point Q' has a coordinate of A on the x-axis and a coordinate of B on y-axis, and the reference point Q' corresponding to the touch control point Q on the touch screen 12 has a maximum capacitance. By referring to the capacitance distribution illustrated in FIG. 4B, the perpendicular distance d between the stylus 11 and the touch screen 12 may be determined through a capacitance at the reference point Q', the relative angle between the pointing direction of the stylus 11 and the normal direction of the touch screen 12 may be determined also through the capacitance distribution.

Figure 4C:
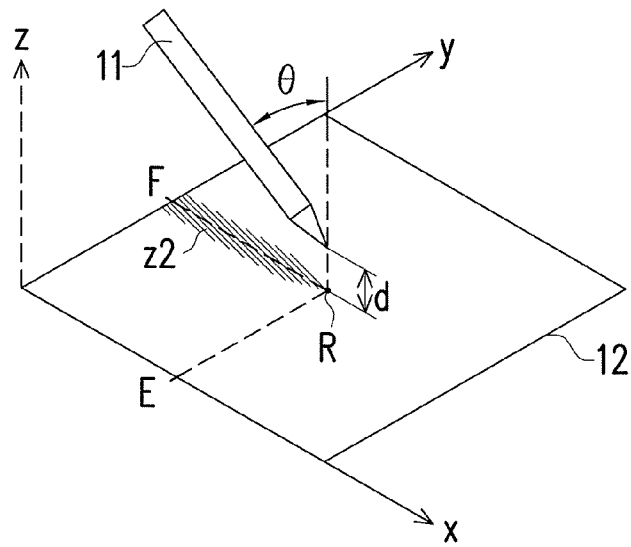
FIG. 4C is a diagram illustrating another example of the touch operating method according to an embodiment of the disclosure.
Figure 4D:
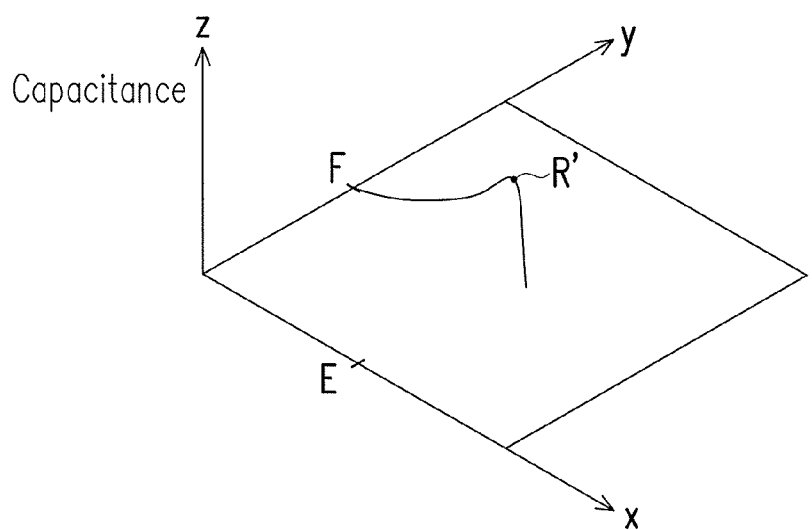
FIG. 4D is a diagram illustrating a capacitance distribution according to an embodiment of the disclosure.

FIG. 4C is a diagram illustrating another example of the touch operating method according to an embodiment of the disclosure. FIG. 4D is a diagram illustrating a capacitance distribution according to an embodiment of the disclosure. With reference to FIG. 4C, in the example, the touch detecting components of the touch screen 12 are capacitive touch detecting components, and it is assumed that an x-axis and an y-axis are respectively parallel to the two edges of the touch screen 12 that are perpendicular to each other and an z-axis is in the normal direction of the touch screen 12.

Based on the description above, the capacitance sensed by the touch detecting components varies according to the distance between the touch object and the touch screen 12. When the capacitances sensed by the touch detecting components are combined, a capacitance distribution illustrated in FIG. 4D may be formed. As illustrated in FIG. 4C, when the stylus 11 approaches a touch point R on the touch screen 12 having a coordinate of E on x-axis and a coordinate of F on y-axis with a relative angle θ between the pointing direction of the stylus 11 and the normal direction of the touch screen 12, the touch detecting components within a region z2 on the touch screen 12 generate changes in capacitance in response to the approach of the stylus 11.

FIG. 4D is a diagram illustrating the capacitance distribution generated in a condition relative to the condition illustrated in FIG. 4C. With reference to FIG. 4D, a reference point R' has a coordinate of E on the x-axis and a coordinate of F on the y-axis, where the reference point R' corresponds to a touch point R and has a maximum capacitance. By referring to the capacitance distribution illustrated in 4B, a perpendicular distance d between the stylus 11 and the touch screen 12 may be determined through a capacitance at the reference point R'. Based on FIG. 4B and FIG. 4D, the capacitance distribution changes as the stylus 11 approaches the touch screen 12 in different relative angles. Therefore, a relative angle θ between the pointing direction of the stylus 11 and the normal direction of the touch screen 12 may also be determined through the capacitance distribution.

In short, the capacitance distribution obtained from a plurality of touch detecting components in the touch screen 12 may be obtained by detecting the touch object through touch screen. Furthermore, the relative angle between the pointing direction of the touch object and the normal direction of the touch screen may also be determined according to characteristics of the capacitance distribution. For example, the characteristics of the capacitance distribution utilized for determining the pointing direction of the touch object may be a variance of the distribution. In general, a smaller variance of the capacitance distribution indicates that the touch object approaches the touch screen in a smaller relative angle. On the contrary, a greater variance of the capacitance distribution indicates that the touch object approaches the touch screen in a greater relative angle.

On the other hands, in addition to the capacitance, at least one sensor disposed in the electronic device and the touch object may also be utilized to detect the relative angle of the pointing direction of the touch object with respect to the normal direction of the touch screen. For example, a G-sensor may detect orientation data of a device having the G-sensor. If both the touch object and the electronic device are configured with the G-sensor, a tilt angle of the touch object and the orientation data of the electronic device may be determined, respectively. Based on the orientation data of the touch object and the electronic device, a relative angle between the touch screen and the touch object may be determined.

In detail, a first orientation of the touch object is first detected by utilizing a first G-sensor disposed in the touch object, and then a second orientation of the electronic device is detected by utilizing a second G-sensor disposed in the electronic device. At end, a relative angle of the pointing direction of the touch object with respect to the normal direction of the touch screen is calculated according to the first orientation and the second orientation. However, the procedure described above for obtaining the relative angle between the touch screen of the electronic device and the touch object is illustrated as an example, though the disclosure is not limited thereto. For example, the sensor disposed in the touch object and the electronic device may include the G-sensor, a gyroscope, a proximity sensor, infrared sensor, image sensor or any combination thereof.

Figure 5:
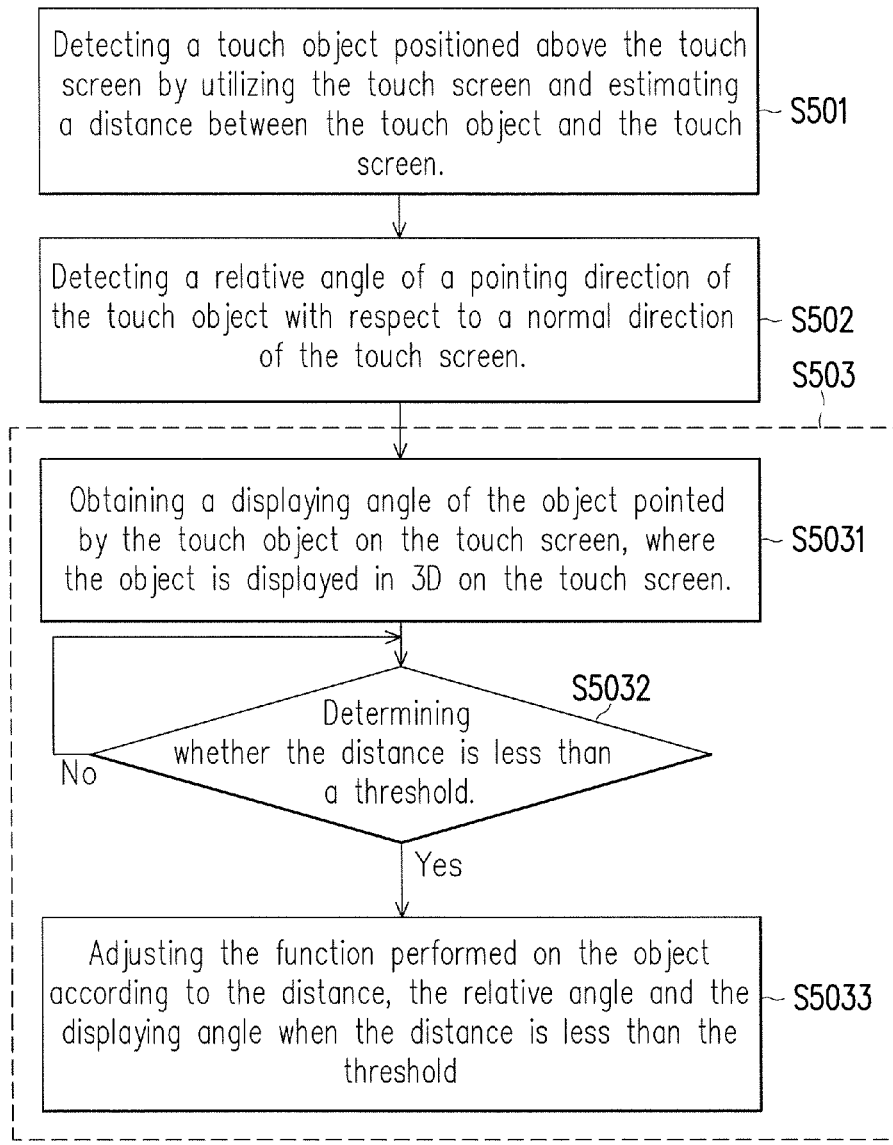
FIG. 5 is a flow diagram illustrating a touch operating method according to another embodiment of the disclosure.

Based on the above, after a distance and a relative angle between the electronic device and the touch object are obtained, the electronic device may further perform any corresponding functions according to the distance and the relative angle. Another embodiment is described below to further describe the disclosure in detail. FIG. 5 is a flow diagram illustrating a touch operating method according to another embodiment of the disclosure. With reference to FIG. 5, the touch operating method is configured for the electronic device 10 illustrated in FIG. 1, and the touch operating method of the disclosure is explained in detail accompanying with each of the units in electronic device 10.

It should be noted that, in the present embodiment, it is assumed that a 3D graphic application has been executed on an electronic device 10, though the disclosure is not limited thereto. First, a distance detecting module 142 detects a touch object above the touch screen 12 by utilizing the touch screen 12, and a distance between the touch object and touch screen 12 is estimated (step S501). The touch object may be a finger of a user or a device configured to perform a hover touch operation (such as a stylus). Next, an angle detecting module 144 detects a relative angle of a pointing direction of the touch object with respect to a normal direction of the touch screen 12 (step S502). The steps S501 and S502 are similar to the steps S201 and S202, so the detail description of the steps S501 and S502 is omitted here.

Afterward, the function executing module 146 executes a function on an object displayed on the touch screen (step S503). The difference between the embodiment illustrated in FIG. 5 and the embodiments described above is the addition of step S503, where step S503 may be divided into steps S5031-S5034. First, in the step S5031, the function executing module 146 obtains a displaying angle of the object pointed by the touch object on the touch screen 12, where the object is displayed in 3D on the touch screen. In detail, in the present embodiment, if the object on the touch screen 12 is displayed in 3D, it indicates that an electronic device 10 has a 3D graphical engine for displaying the object in 3D on the touch screen 12, where the 3D graphic may display each and every angle of the object on the touch screen 12.

Next, in step S5032, the function executing module 146 determines whether the distance is less than a threshold. In other words, the function executing module 146 first determines whether or not the touch object is close enough with respect to the touch screen 12, so as to determine whether the user is trying to perform in a hover touch operation through the touch object. Simply, if the touch object is too far away from the touch screen 12, it indicates that the user is not trying to operate the electronic device 10 through the touch object. As such, it may avoid accidental hover touch operation or prevent the electronic device 10 from executing any unpredicted function or operation. The threshold may be 5 centimeter (cm), 8 cm or configured according to the requirements of the design, though the disclosure is not limited thereto.

When the distance is less than the threshold, in step S5033, the function executing module 146 adjusts the function performed on the object according to the distance, the relative angle and the displaying angle. In other words, when the user is to perform a graphical function on the 3D object displayed on the touch screen 12 through the touch object, the function executing module 146 may adjust a spray effect of the graphical application according to the distance and the relative angle between the touch object and the touch screen 12. For example, a spray range or a spray density of the spray effect of the graphic application is adjusted according to the distance and the relative angle between the touch object and the touch screen 12. On the other hand, the function executing module 146 may determine an orientation of the 3D object where the spray brush is to apply the spray to according to the displaying angle of the object.

Furthermore, for conventional spray function, once the user selected a spray stroke of the spray brush, the spray range or the spray density of the spray function applied to the object is unchangeable. However, for the touch operating method of the disclosure, after the user selected the brush stroke of the spray brush, the user may change the spray range and the spray density through operation of the stylus, so a flexible touch operating method is achieved.

Figure 6A:
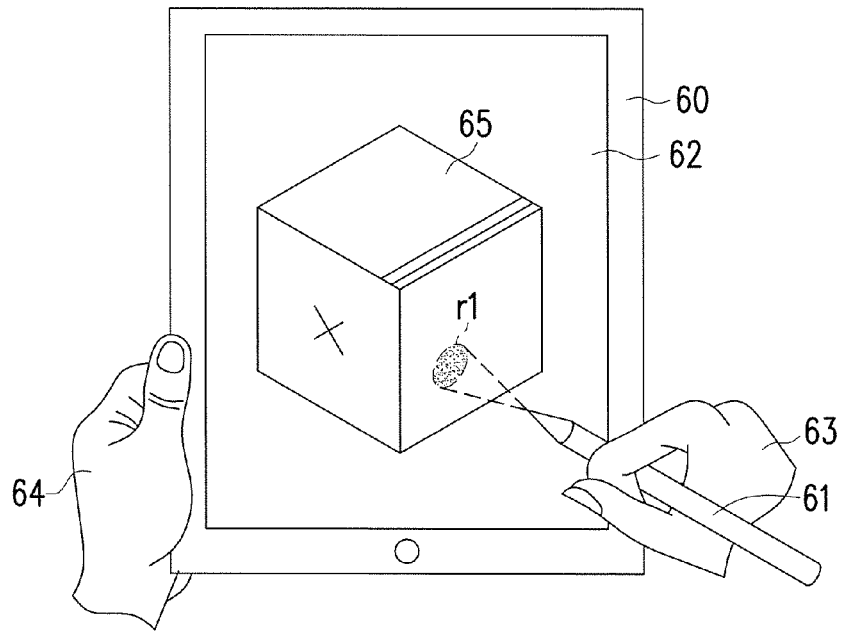
FIG. 6A is a diagram illustrating an example of the touch operating method according to another embodiment.
Figure 6B:
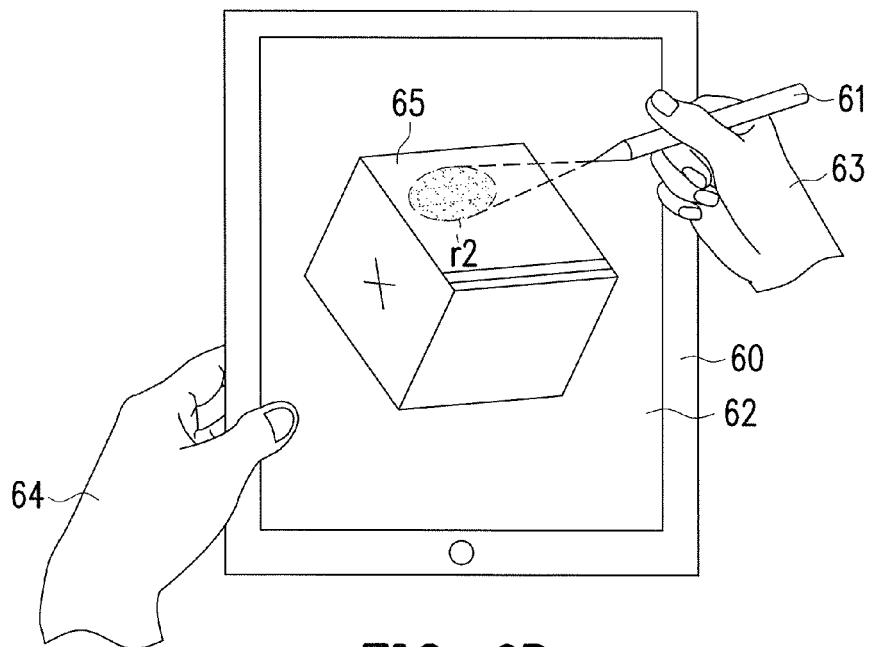
FIG. 6B is a diagram illustrating an example of the touch operating method according to another embodiment.

FIGS. 6A and 6B are examples of the touch operating method according to yet another embodiment of the disclosure. With reference to both FIGS. 6A and 6B, it is assumed that the user is performing a 3D graphical function by utilizing an electronic device 60, the user may hold the electronic device 60 through a hand 64 and hold a stylus 61 through a hand 63 while a 3D object 64 is displayed on the touch screen 62. As illustrated in FIGS. 6A and 6B, the 3D object 65 is a cube. The user may control a displaying angle of the 3D object 65 by a touch operation on the touch screen 62 through the hand 64. On the other hand, when the user starts a spray function of the graphic application, the stylus 61 held by the hand 63 may be defined as the spray brush. Simply, the hand 64 of the user is utilized to control the 3D object 64 while another hand 63 of the user is utilized to hold the stylus 61 which is treated as the spray brush.

Based on the embodiments illustrated in FIG. 1 thru FIG. 5, the electronic device 60 adjusts the function applied to the object displayed on the touch screen according to the distance, the relative angle and the displaying angle of the object. In other words, in the example illustrated in FIGS. 6A and 6B, after the distance and relative angle between the stylus 61 and the touch screen 62 are detected, the spray range and the spray density of the spray function applied to the object 65 may be adjusted according to the detected distance. As illustrated in FIG. 6A, when the hand 63 holds the stylus 61 above the touch screen 62 in a way illustrated in FIG. 6A, the spray range of the spray function forms a region r1 on the 3D object 65. As illustrated in 6B, when the hand 63 holds the stylus 61 above the touch screen 62 in a way as illustrated in FIG. 6B, the spray range of the spray function forms a region r2 on the 3D object 65.

Comparing FIGS. 6A and 6B, an area of the region r1 is clearly smaller than the region r2, and the spray density within the region r1 is greater than the spray density within the region r2. In other words, when the distance between the stylus 61 and the touch screen 62 gets closer, the spray density increases and the spray range decreases. When the distance between the stylus 61 and the touch screen 62 gets further away, the spray density decreases and the spray range increases. In addition, the shapes of the region r1 and region r2 are different because the angles between the stylus 61 and the touch screen 62 are different. From the shapes of the region r1 and regions r2, the relative angle between the pointing direction of the stylus 61 and the normal direction of the functioned region r1 of the 3D object 65 is smaller, and the relative angle between the pointing direction of the stylus 61 and the normal direction of the functioned region r2 of the 3D object 65 is larger.

It should noted that, after the spray density and the spray range are obtained by utilizing the distance and the angle, the calculated spray range and spray density may be previewed on the touch screen 62, so that the user may know the spray range and spray density before the execution of the spray function. Therefore, during a period when the user performs the spray function, the user may adjust the spray range and spray density according to the distance and angle between the stylus 61 and the touch screen 62. It should be noted that, the spray function described above is utilized as an exemplary embodiment to make the disclosure be comprehensible, however, it is not intended to limit the disclosure. For example, the disclosure may be applied to a ceramic simulation application, where the stylus may be configured as a spray performing a flame function. Simply, the range of the flame gets smaller as the stylus moves closers to the touch screen, and the range of the flame gets greater as the stylus moves away from the touch screen.

In summary, the electronic device and the touch operating method thereof of the present disclosure provides a function to an object displayed on the screen according to a distance and a relative angle between a touch object and a touch screen. Accordingly, users may operate the electronic device with better experience according to the intuitive feelings of the user toward distance and angle. Furthermore, the disclosure further integrates a graphic function performed on the touch screen by the stylus or other touch objects. In addition to a preview of the spray stroke, the disclosure further enhances user's experience in reality through the distance and angle of the touch object.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A touch operating method of an electronic device, configured for an electronic device having a touch screen, wherein the touch operating method comprises:
   detecting a touch object positioned above the touch screen by utilizing the touch screen, and estimating a distance between the touch object and the touch screen;
   detecting a relative angle of a pointing direction of the touch object with respect to a normal direction of the touch screen; and
   performing a function on an object displayed in the touch screen according to the distance and the relative angle,
   wherein the step of detecting the relative angle of the pointing direction of the touch object with respect to the normal direction of the touch screen comprises:
   obtaining a capacitance distribution by detecting the touch object through a plurality of the touch detecting components of the touch screen; and
   determining the relative angle of the pointing direction of the touch object with respect to the normal direction of the touch screen according to a characteristic of the capacitance distribution,
   wherein the characteristic of the capacitance distribution utilized for determining, relative angle of the pointing direction of the touch object comprises a variance of the capacitance distribution, and the relative angle decreases as the variance of the capacitance distribution decreases, and the relative angle increases as the variance of the capacitance distribution increases.

2. The touch operating method as claimed in claim 1, wherein the step of detecting the relative angle of the pointing direction of the touch object with respect to the normal direction of the touch screen comprises:
   detecting a first orientation of the touch object by utilizing a first G-sensor disposed in the touch object;
   detecting a second orientation of the electronic device by utilizing a second G-sensor disposed in the electronic device; and
   calculating the relative angle of the pointing direction of the touch object with respect to the normal direction of the touch screen according to the first orientation and the second orientation.

3. The touch operating method as claimed in claim 1, wherein the step of performing the function on the object displayed in the touch screen according to the distance and the relative angle comprises:
   determining whether the distance is less than a threshold; and
   performing the function on an object displayed in the touch screen according to a variation of the distance and the relative angle when the distance is less than the threshold.

4. The touch operating method as claimed in claim 1, wherein the step of performing the function on the object displayed in the touch screen according to the distance and the relative angle further comprises:
   obtaining a displaying angle of the object displayed in the touch screen as well as pointed by the touch object, wherein the object is displayed in a three-dimensional manner; and
   adjusting the function performed on the object according to the distance, the relative angle and the displaying angle.

5. The touch operating method as claimed in claim 4, wherein the step of adjusting the function performed on the object according to the distance, the relative angle and the displaying angle further comprises:
adjusting a spray density and a spray range of a spray function performed on the object according to the distance,
wherein, the spray density increases and the spray range decreases as the distances decreases, and the spray density decreases and the spray range increases as the distances increases.

6. An electronic device, comprising:
a touch screen;
a storage unit, configured to record a plurality of modules; and
one or more processing units, coupled to the touch screen and the storage unit and configured to access and execute the modules recorded in the storage unit, wherein the modules comprises:
a distance detecting module, detecting a touch object positioned above the touch screen by utilizing the touch screen, and estimating a distance between the touch object and the touch screen;
an angle detecting module, detecting a relative angle of a pointing direction of the touch object with respect to a normal direction of the touch screen; and
a function executing module, performing a function on an object displayed in the touch screen according to the distance and the relative angle,
wherein the angle detecting module comprises obtaining a capacitance distribution by detecting the touch object through a plurality of touch detecting components of the touch screen, and determining the relative angle of the pointing direction of the touch object with respect to the normal direction of the touch screen according to a characteristic of the capacitance distribution,
wherein the characteristic of the capacitance distribution utilized for determining relative angle of the pointing direction of the touch object comprises a variance of the capacitance distribution, and the relative angle decreases as the variance of the capacitance distribution decreases, and the relative angle increases as the variance of the capacitance distribution increases.

7. The electronic device as claimed in claim 6, wherein the angle detecting module comprising detecting a first orientation of the touch object by utilizing a first G-sensor of the touch object, detecting a second orientation of the electronic device by utilizing a second G-sensor of the electronic device, and calculating the respective angle of the pointing direction of the touch object with respect to the normal direction of the touch screen according to the first orientation and the second orientation.

8. The electronic device as claimed in claim 6, wherein the function executing module comprises determining whether the distance is less than a threshold, and performing the function on an object displayed in the touch screen according to a variation of the distance and the relative angle when the distance is less than the threshold.

9. The electronic device as claimed in claim 6, wherein the function executing module further obtains a displaying angle of the object pointed by the touch object on the touch screen, and adjust the function performed on the object according to the distance, the relative angle and the displaying angle, wherein the object is displayed in a three-dimensional manner.

10. The electronic device as claimed in claim 9, wherein the function executing module further performs a spray density and a spray range of a spray function on the object according to an distance adjustment, wherein the spray density increases and the spray range decreases when the distance gets closer, and the spray density decreases and the spray range increases when the distance gets further.

* * * * *